United States Patent
Hoffmann et al.

(10) Patent No.: US 6,410,894 B1
(45) Date of Patent: Jun. 25, 2002

(54) METALLIC OVERCOAT FOR THICK FILM HEATER TERMINATION

(75) Inventors: Michael Hoffmann, Wolzbachtal; Reinhardt W. Lehnert, Ubstadt-Weihen, both of (DE)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 09/687,417

(22) Filed: Oct. 12, 2000

(51) Int. Cl.$^7$ .................................................. H05B 3/16
(52) U.S. Cl. ....................................... 219/543; 425/549
(58) Field of Search ............................... 425/549, 144, 425/547; 219/538, 543, 523, 421, 424, 541, 544, 548, 549; 264/237; 392/780; 338/308

(56) References Cited

U.S. PATENT DOCUMENTS

| | | | |
|---|---|---|---|
| 4,304,544 A | * 12/1981 | Crandell | 425/549 |
| 4,897,028 A | * 1/1990 | Barancik | 425/144 |
| 5,434,388 A | * 7/1995 | Kralik et al. | 219/338 |
| 5,569,474 A | * 10/1996 | Kitaichi et al. | 425/547 |
| 5,973,296 A | * 10/1999 | Juliano et al. | 219/424 |
| 6,168,740 B1 | * 1/2001 | Koch et al. | 264/237 |

* cited by examiner

*Primary Examiner*—Teresa Walberg
*Assistant Examiner*—Leonid Fastovsky
(74) *Attorney, Agent, or Firm*—Blumenfeld, Kaplan & Sandweiss, P.C.

(57) ABSTRACT

A metallic overcoat is shown for use on the termination of a thick film heater. The invention is specifically useful for reducing overall wall thickness on thick film heaters used in the injection molding industry. The overcoat is placed over at least the termination point of the heating element with access holes for the termination. Thereafter, holes are drilled parallel to the heater axis for the insertion of power leads. The overcoat further provides insulation for better efficiency and mechanical protection for the heating element.

7 Claims, 3 Drawing Sheets

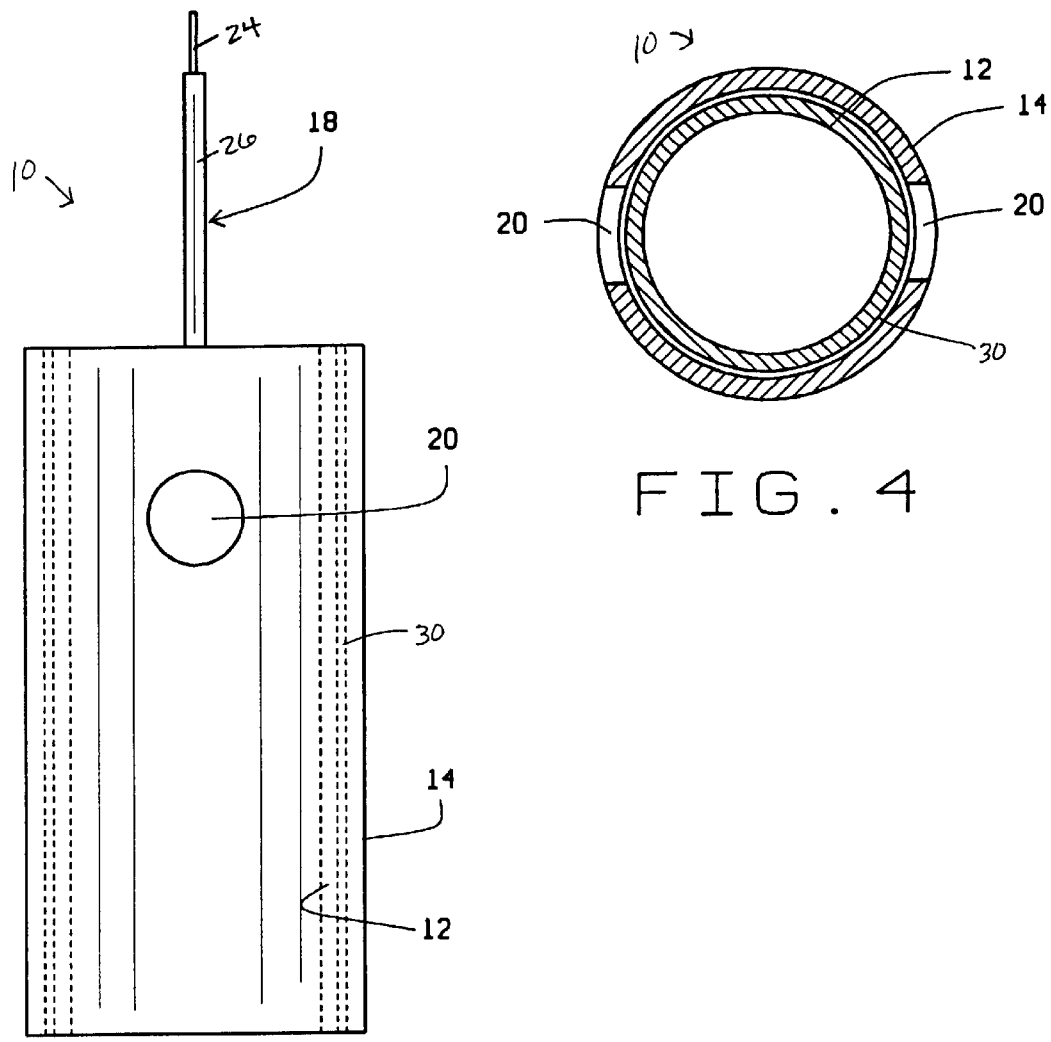
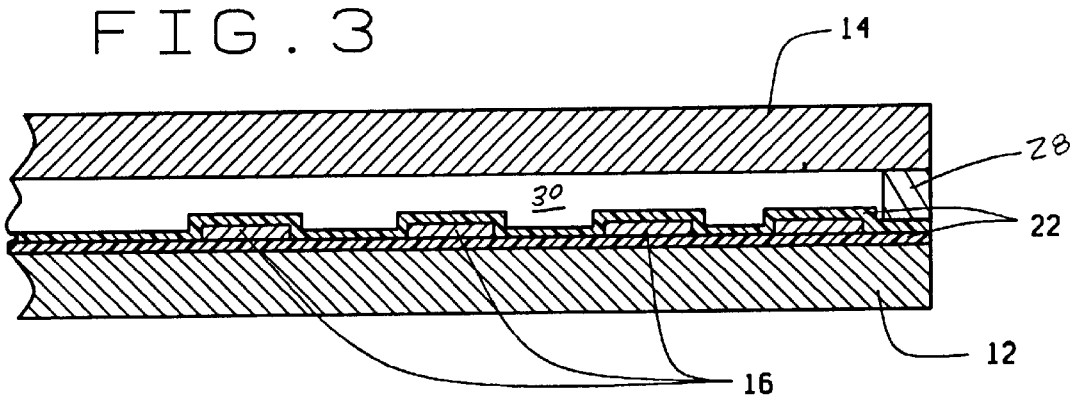

METALLIC OVERCOAT FOR THICK FILM HEATER TERMINATION

FIELD OF THE INVENTION

The present invention relates to thick film heaters, such as those used for injection molding nozzles, and more particularly to a metallic overcoat for the termination of the same.

BACKGROUND OF THE INVENTION

The injection molding industry in particular has long needed improved heating for runner nozzles. A typical injection molding systems has a multitude of heated passage ways carrying melted thermoplastics ("melt"). The melt is delivered into molds via a series of runner nozzles. It is vital that these runner nozzles be kept heated to prevent the melt from freezing too early, before it reaches the mold cavity. If a portion of the melt freezes in the nozzle, the nozzle is incapable of adequately controlling the flow rate of the melt, and may become completely blocked in some instances.

It is well known to place electrical resistance heaters around the runner nozzles to prevent the melt from freezing. Over the years, many new advancements have been made to the heaters to make them more reliable, provide more even heat distribution, and to reduce the size of the heaters. The size of the heater is an important factor, particularly with small mold sizes. Obviously, the smaller the heater around the nozzle, the more nozzles (with heaters) can be placed on the same manifold. Every millimeter saved in the size of the heater thickness can possibly result in several additional nozzle/mold combinations on the same manifold.

Eventually experimentation began involving the use of thick film heating elements to heat the runner nozzles. Only in very recent years was the idea of thick film heating for runner nozzles made feasible and practical by Watlow Electric Manufacturing Company of St. Louis, Mo. Watlow's improvement is disclosed in U.S. Pat. No. 5,973,296 to Juliano et al. ("the '296 patent"), which is incorporated herein by reference in its entirety. Essentially, the '296 patent taught placing the thick film heating element on a metal tubular substrate with a dielectric film on either side of the heating element.

Although the '296 patent represents a giant advancement in the art of runner nozzle heating, it still has its limitations as disclosed. The most significant limitation of the '296 patent is the attachment of the power leads. The thick film nozzle heater of the '296 patent is significantly thinner than any other heaters that could deliver heat as reliably and as evenly. It is significantly thinner than heaters with coiled resistance wire, but the magnitude space conservation is based on the width at thickest portion of the heater design, which is typically the termination of the heating element. The heating element must have an electrical current to operate, and that current must be fed by some sort of power lead. The power leads in the '296 patent represent the thickest portion of the heater.

Additionally, the biggest limitation in the '296 heater compared to its coiled resistance wire ancestors is mechanical strength. Coiled resistance wire heaters have an outer sheath, typically made of stainless steel or similar alternative. The thick film heater, although tough in its own right, is more vulnerable to physical damage than a heating element with an outer metal sheath.

SUMMARY OF THE INVENTION

Accordingly, it is an object of the present invention to provide a thick film heater with a minimized maximum heater thickness.

It is a further object of the present invention to provide improved mechanical resistance for the heating element.

It is still a further object of the present invention to provide such a heater with improved thermal efficiency.

In view of the above objects, the present invention is a tubular thick film heater with a metallic overcoat placed over at least the termination portion of the heater. The overcoat satisfies, directly and indirectly, all of the above objects. The overcoat obviously provides mechanical safety to the heating element, but in the presented embodiment below, it allows the power leads to be attached to the heating element in a way that does not increase wall thickness of the heater. This actually reduces the total thickness of the heater (even with the overcoat) when compared to a thick film heater with conventionally attached power leads. Lastly, the overcoat directs more heat transfer through the substrate (inner layer), and thus onto the runner nozzle. The added heat transfer (or reduced heat loss to the outside) means a more efficient heater and less energy consumption.

The overcoat is placed around the thick film heater with holes pre-drilled therein to match the termination points of the heating element. This allows the termination points to be seen through the holes in the overcoat. Narrow holes parallel to the axis of the tube are then drilled in the joined assembly. Power leads are then inserted into the narrow holes. The larger holes in the overcoat wall allow the power leads to be properly affixed to the termination points on the heating element using any one of several known methods. Once the heating element is properly terminated, the hole in the overcoat is filled in with a dielectric potting material. Although the overcoat can run the entire length of the heater, it is foreseeable that the overcoat may only cover the termination portion of the heating element.

The resulting heater has a wall thickness on the order of 2 millimeters. More importantly, however, the termination of the heating element and the power leads do not increase the overall heater thickness at all.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted however, that the appended drawings illustrate only a typical embodiment of this invention and is therefore not to be considered limiting of its scope, for the invention may admit to other equally effective embodiments. Reference the appended drawings, wherein:

FIG. 3 is a side view closeup of the termination portion of the heater of FIG. 1;

FIG. 4 is a top view of the heater of FIGS. 2 and 3 taken along line 4—4;

FIG. 5 is a cross-sectional view of the substrate, heating element, and overcoat of the heater of FIG. 1;

DETAILED DESCRIPTION OF THE DRAWINGS

Figure 1:
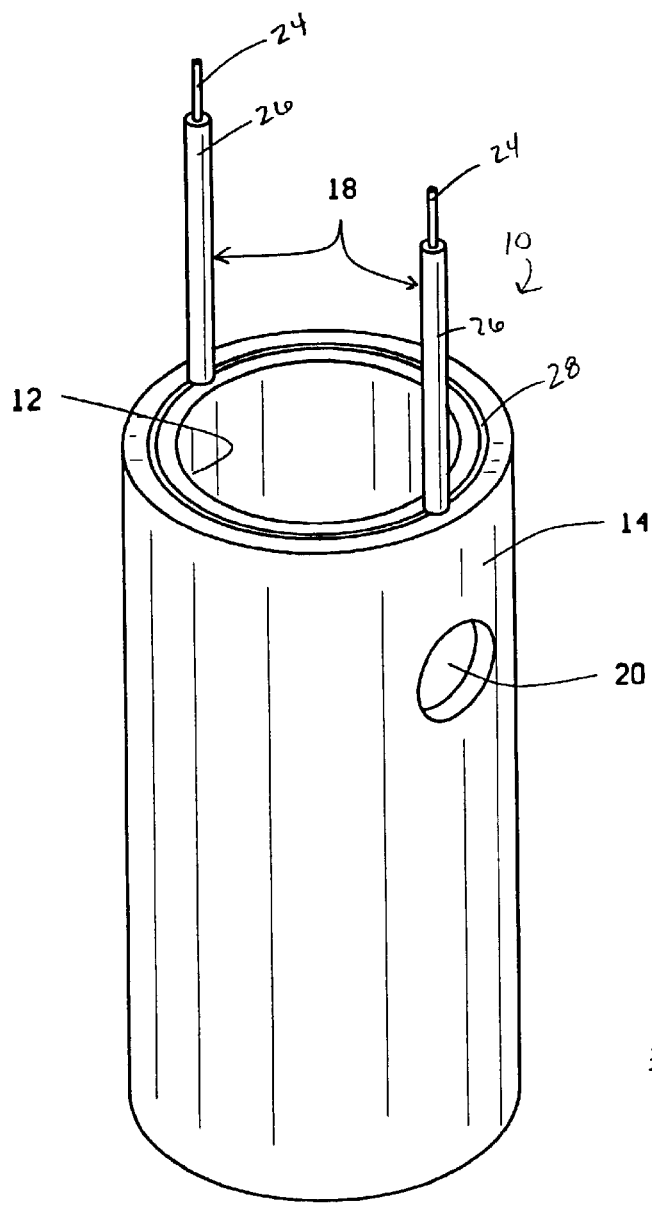
FIG. 1 is an isometric view of a heater constructed according to the present invention.

Referring now to FIG. 1 an electric heater 10 is shown generally according to the present invention. The heater 10 consists of a tubular substrate 12 and a metallic overcoat 14. The overcoat 14 may be made of any suitable material. Keeping in mind that one object for the overcoat is to provide mechanical protection to the heating element, 304 stainless steel is recommended. In between the substrate 12 and the overcoat 14 is a thick film heating element 16, which is not visible in FIG. 1, but best seen in the cross-section of FIG. 5. As the substrate 12 is typically metallic as well (430 stainless steel is exemplary), the preferred embodiment includes a dielectric film 22 surrounding the heating element (except at the termination portion). Also extending from the substrate 12 and overcoat 14 combination are a plurality of power leads 18. The power leads 18 may extend from the heater 10 at positions diametrically opposed on the substrate 12/overcoat 14 as shown in the figures. In the majority of applications, however, it will be preferable to have the power leads 18 extend from positions located close to one another on the substrate 12.

Figure 2:
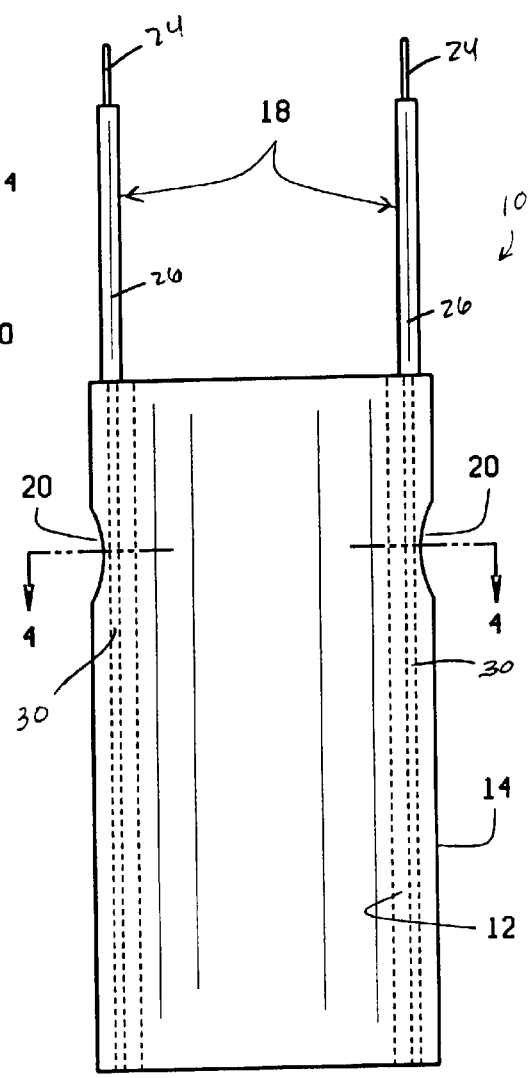
FIG. 2 is a front view closeup of the termination portion of the heater of FIG. 1.

Referring now to FIGS. 2–4, the termination portion of heater 10 is shown more closely. The overcoat 14 has a plurality of access holes 20 drilled therein before installation thereof over the substrate 12 and heating element 16. The number of access holes 20 should match the number of termination points for the heating element 16. Most typically, the heater 10 will have a single heating element 16 with two terminating points. It is conceivable, however, that the heater would have multiple heating elements, a three-phase heating element, or a separate sensor circuit, all of which may result in more than two terminating points, and thus more than two access holes 20.

For a typical heater 10, the access holes 20 will be approximately 6 mm in diameter, but this size will vary depending upon the overall size of the heater 10 and the types of power leads 18 being installed. The access holes 20, as will be seen later on, are used to complete the termination of the heating element 16 with the power leads 18. Once the overcoat 14 is cut to the proper length to match that of the substrate 12, and the access holes 20 are drilled, it is installed over the substrate 12. At this point, the substrate 12 already has a heating element 16 and dielectric film 22 in place. Essentially, the substrate 12 is a completed prior art heater according to the '296 patent, however prior to termination of the heating element.

In the preferred embodiment, the overcoat 14 should have a small clearance between it and the dielectric film 22 protecting the heating element 16. This air gap 30 not only keeps the overcoat 14 from damaging the heating element 16 during assembly, but also provides a natural insulator. Since the heating element 16 does not have a conductive heat transfer path to the overcoat 14, a larger portion of the heat is directed inward to the target object. To help maintain the air gap 30 between the overcoat 14 and the heating element 16, annular spacers 28 may be used at either end of the overcoat 14. The gap 30 should be very small relative to the substrate 12 and overcoat 14. A typical heater 10 may have a total wall thickness of 2.0 millimeters, of which the substrate 12 and overcoat 14 together account for 1.6 millimeters. The total wall thickness should not exceed 2.0 millimeters under normal circumstances, a thinner wall is acceptable and even desirable for some heater sizes.

In place of spacers 28, it is also possible to fill any gaps at the ends of the resulting substrate-overcoat combination with a potting material (such as the same material used to pot the access holes 20 discussed below). Another option is to form a tight precision fit between the heating element 16 and the inside of the overcoat 14, although this is not preferred. In addition to any of the above-mentioned methods of positioning the overcoat 14 around the hearing element 16, a plurality of very small pins (not shown) may optionally be inserted at one or both ends to help hold the relative positions of the various parts of the substrate 12, the overcoat 14, and if used, the spacers 28.

After the overcoat 14 is properly positioned, holes for the power leads 18 are drilled in the end of heater 10, the holes being parallel to the axis of the heater 10. The power leads 18 may be of any conventional type, however, the inventors have found that mineral insulated leads are particularly well suited for the typical applications of the present invention. It should be noted at this point that while the present invention was developed with the injection molding industry in mind, it is in no way limited to such an application. The present invention may be used in any application requiring an annular or ring-type heater, particularly where overall wall thickness or physical protection of the hearing element are primary concerns.

Figure 8:
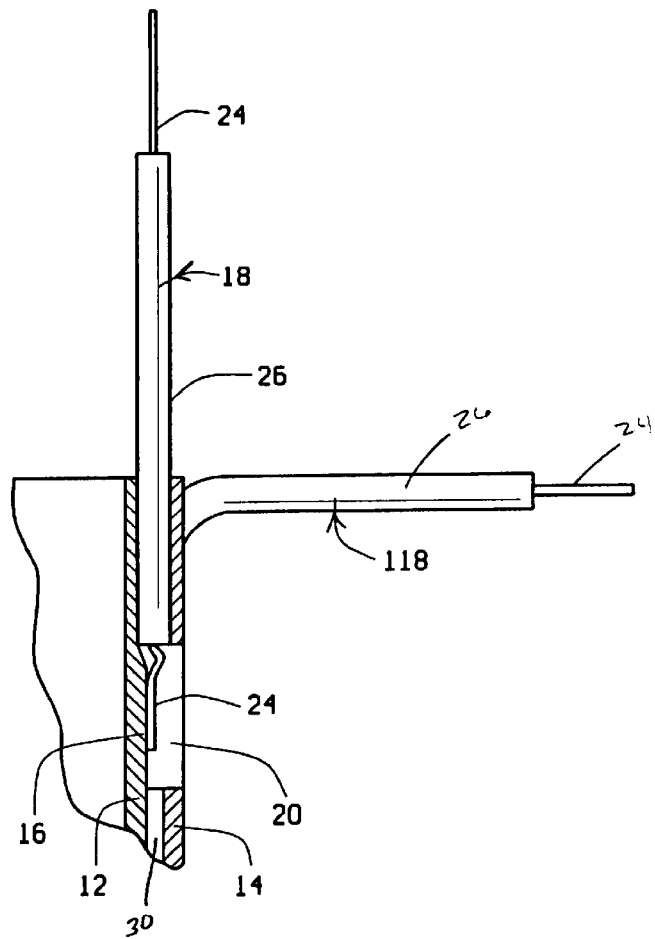
FIG. 8 is a detail of the termination of the present heater according to either embodiment.

Once the power leads 18 are inserted, the access holes 20 are used to properly terminate the heating element 16 with the power leads 18. This connection can be made using brazing, epoxy, welding, a cured conductive paste, or any other connection technique that is well known in the art. The connection can be seen in detail in FIG. 8. By way of example, FIG. 8 shows mineral insulated leads 18 (both in the typical straight embodiment and in a right-angle embodiment as discussed below). The mineral insulated power lead 18 consists of a conductor element 24 surrounded by an insulating element 26 made of magnesium-oxide-filled metal cable.

Once the heating element 16 is terminated, the access holes 20 are no longer needed. Therefore, it is desirable to refill the access holes 20 with a potting material. The inventors have found AB1000F manufactured by Cuyahoga Plastics of Cleveland, Ohio to be particularly appropriate and preferred. Sauereisen® cement manufactured by Sauereisen, Inc. of Pittsburgh, Pa. has also been found to be suitable.

Figure 6:
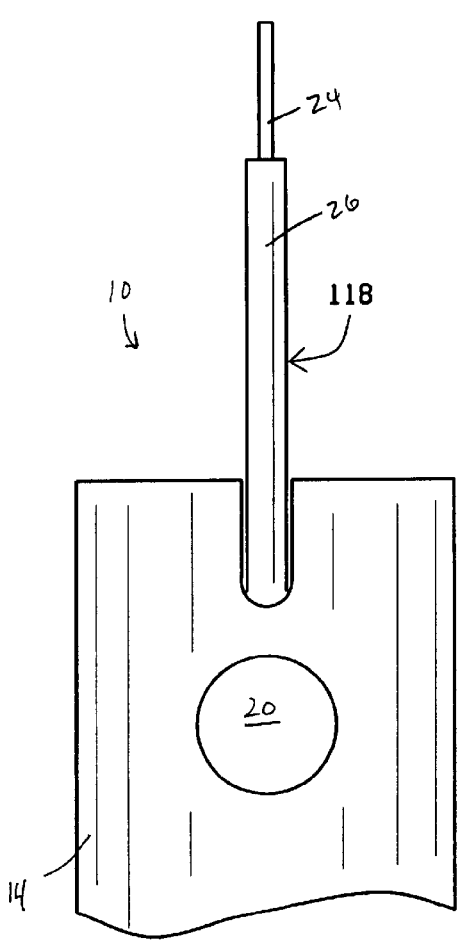
FIG. 6 is a front view closeup of the termination portion of an alternate embodiment of the present invention having angled leads.
Figure 7:
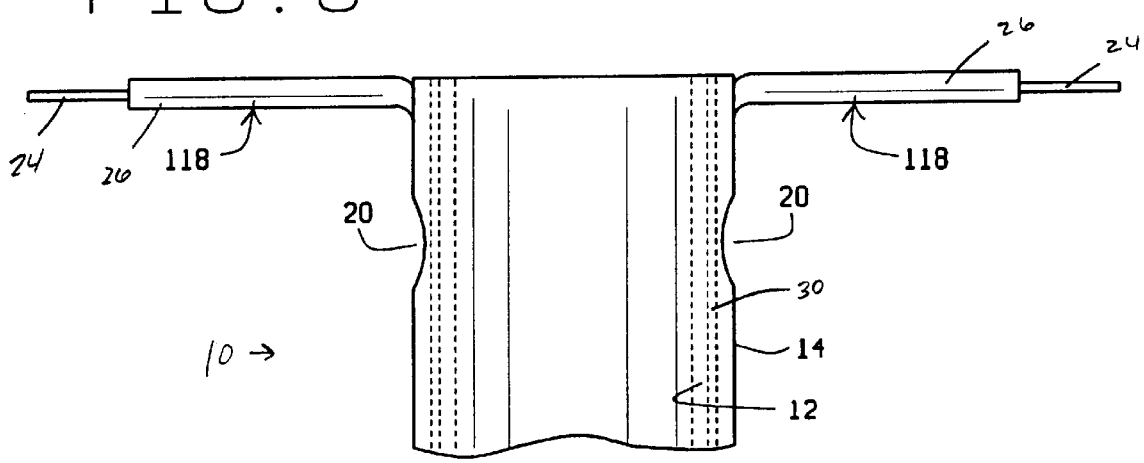
FIG. 7 is a side view closeup of the termination portion of the alternate embodiment of FIG. 6.

FIGS. 6 and 7 show an alternate embodiment of the present invention. As is readily seen, the power leads 118 exit the heater 10 at a right-angles to the heater axis. Of course, lesser angles may be used. The right-angle embodiment requires the addition of a slot 32 placed in the overcoat 14 before the installation thereof. This allows the power leads 118 to be installed the same way, as is seen in FIG. 8, but keeping the leads 118 flush with the end of the heater 10. At the same time the overall thickness of the heater 10 is kept to a minimum all of the way up to the very end of the heater 10 where the leads 118 emerge.

As mentioned above, in the Summary of the Invention, it is foreseeable that the overcoat 14 might only extend over the termination of the heating element 16. This envisioned embodiment still provides the advantage of a very small overall heater wall thickness after termination. However, the advantages of an insulating air gap 30 and mechanical protection for the heating element 16 are lost.

While the foregoing is directed to the preferred embodiments of the present invention, other and future embodiments of the invention may be devised without departing from the basic scope thereof, and the scope thereof is determined by the claims which follow.

We claim:

1. An electric heater comprising:

a tubular substrate;

a thick film resistive heating element disposed about said substrate; and a metallic overcoat encasing at least a termination portion of said heating element between said substrate and said overcoat.

2. The electric heater of claim 1, further comprising a plurality of power leads extending from said heating element parallel to an axis of said tubular substrate.

3. The electric heater of claim 2, further comprising a plurality of holes bored therein, said power leads being located in said holes, and said holes overlapping said substrate and said overcoat.

4. The electric heater of claim 1, further comprising termination access points located in said overcoat.

5. The electric heater of claim 4, wherein said termination access points are filled with a potting material.

6. The electric heater of claim 1, wherein said overcoat extends the entire length of said substrate.

7. The electric heater of claim 1, wherein said overcoat does not extend the entire length of said substrate.

* * * * *